(12) United States Patent
Kelley et al.

(10) Patent No.: US 6,738,084 B1
(45) Date of Patent: May 18, 2004

(54) INTERACTIVE SCROLLING REFERENCE METHOD

(75) Inventors: Edward E. Kelley, Wappinger Falls, NY (US); Franco Motika, Hopewell Junction, NY (US); Paul Victor Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/395,395

(22) Filed: Sep. 13, 1999

(51) Int. Cl.[7] ................................................. G09G 5/00
(52) U.S. Cl. ......................... 345/784; 345/786; 345/830
(58) Field of Search ................................ 345/787, 786, 345/785, 784, 830, 833

(56) References Cited

U.S. PATENT DOCUMENTS

| | | | |
|---|---|---|---|
| 5,333,247 A | | 7/1994 | Gest et al. |
| 5,339,391 A | * | 8/1994 | Wroblewski et al. ....... 345/607 |
| 5,506,951 A | * | 4/1996 | Ishikawa .................... 345/786 |
| 5,510,808 A | | 4/1996 | Cina, Jr. et al. |
| 5,550,969 A | * | 8/1996 | Torres et al. ............... 345/787 |
| 5,802,516 A | | 9/1998 | Shwarts et al. |
| 5,896,132 A | | 4/1999 | Berstis et al. |
| 6,147,683 A | * | 11/2000 | Martinez et al. ............ 345/786 |
| 6,331,866 B1 | * | 12/2001 | Eisenberg ................... 345/784 |

* cited by examiner

*Primary Examiner*—John Cabeca
*Assistant Examiner*—Shawn Becker
(74) *Attorney, Agent, or Firm*—James J. Cioffi

(57) ABSTRACT

Methods, data processing systems or program products which provide a user interface capable of inserting a reference marker at a point within an application window, causing a first representation of the reference marker to be displayed at that point and a second representation of the reference marker to be displayed in a scroll bar area within the application window which precisely corresponds to the location of the point. A pointing operation can be performed on the second representation of the reference marker causing the first representation of the reference marker along with the operating point to immediately appear within the application window. Additional reference markers may be inserted at additional points within the application window allowing the user to immediately find and display any point within the application window that the user has referenced with a reference marker. A pointing operation can be performed on the second representation of the reference marker to remove the reference marker from the application window. The characteristics of the reference marker, such as size, style, position, and color can be changed by performing another pointing operation on the second representation of the reference marker.

15 Claims, 7 Drawing Sheets

Fig. 5

...understand. The concept of "key escrow" itself is fairly easy to grasp, since escrowing of cryptographic keys may be likened to a homeowner giving a copy of the key to his house to a trusted neighbor in case the homeowner should inadvertently lock himself out of his house. However, even in such a common case as this, there is a potential vulnerability for the homeowner. He may trust his neighbor, but others — such as members of the neighbor's own family — may acquire unacceptable access to the key. For example, a person wanting unauthorized access to

- Assuring Access For All ▸
- Making Electronic Commerce Work ▸
- Protecting Our Health And Safety ▸
- Rethinking Government

---

☆ ACME CORP'S WEB PAGE - WEB BROWSER  _ □ ✕

FILE  EDIT  VIEW  GO  HELP

BOOKMARKS  LOCATION: http://www.acme.com/ ▽

- Rethinking Government ▸
- Achieving Educational Equity With Advanced Technology ▸
- A New Vision For The Utility And Energy Services Industry ▸
- Reducing Uncertainty In Our Health Care ▸

...example, a person wanting unauthorized access to the homeowner's key may try to bribe the neighbor's son or daughter to provide the unauthorized person with a copy of the key. Thus, under this kind of escrowing system, there is a single point of vulnerability.

Cryptographers have developed several ways to address this problem, one being the "split key" approach to escrowing of keys. For example, many homeowners have more than one lock on their houses. So, the homeowner may simply take one of the keys and give it to a neighbor and give the other to another neighbor. This is a little more cumbersome in case the homeowner locks himself out, but it is more secure. The person seeking unauthorized access would have to bribe two neighbors. Still, these two sources of vulnerability may pose an unacceptable degree of risk for a homeowner who has a multimillion-dollar art collection. Transferring keys itself generates what many will consider to be unacceptable risk.

Cryptographers are now beginning to work on so-called "key recovery" approaches as an

DOCUMENT : DONE

- Banking In The Network Economy ▸
- How Network Computing Is Changing Industrial Processes ▸
- How Travel & Transportation Will Change In a Networked...
- Transportation Will Change In a Networked World ▸
- A Global Cryptographic Policy Framework ▽
  - ° Abstract
  - ° Introduction Cryptographers are now beginning to work on so-called "key recovery" approaches as an alternative to such key escrow systems. Under these systems, no key is ever transferred to another party. In the homeowner analogy, keys would be kept only by the homeowner. To understand key recovery, it is better to think of a combination lock on the front door of a house. In this case, there is a series of digits — say, a 6-digit combination — which the homeowner may give to his neighbor

INTERACTIVE SCROLLING REFERENCE METHOD

FIELD OF THE INVENTION

The present invention relates generally to a user interface for computers. More particularly, the present invention relates to a user interface that allows a user to reference and immediately find a point within an application window.

BACKGROUND OF THE INVENTION

Increases in processing capability and decreases in the cost of personal computers has led to the proliferation of personal computers in all aspects of society. Personal computers are utilized in schools, homes and in business. Furthermore, with the decreased costs of personal computers, it has become more feasible from a cost perspective to use computers for tasks, and to carry out functions, which were previously done without the use of computers.

With the proliferation of computers throughout numerous aspects of life has come a trend to use graphical user interfaces which make using a computer more intuitive. Examples of such graphical user interfaces include IBM OS/2®, Apple® Macintosh®, and Microsoft Windows®. These operating systems all rely on a "window like" workspace called an application window for running applications, displaying operating system information, such as directory information, and organizing program groupings. An application window may be displayed on the screen of a computer display device in what is often referred to as a "desktop". An application window within a desktop is defined by a border which surrounds the application window and may also include a title bar and in some cases a menu which may manage the appearance and contents of the application window. If the application window is running an application, an electronic document will appear within the application window. The electronic document may be a word processing file, a spreadsheet, an HTML document, a graphics document, a presentation document, or any other document which can be displayed within an application window.

The current display within the application window is called an active screen. The application window displays a portion of the electronic document or the entire electronic document, depending on the size of the electronic document. In a large electronic document only a portion of the electronic document can be viewed in the application window so a scrolling bar area including a scrolling bar is displayed within the application window. The scrolling bar allows the user to scroll through the electronic document to any point within the electronic document. If the electronic document is so large in the vertical direction that the entire electronic document cannot be displayed in the application window, a vertical scroll bar area and a vertical scroll bar appear in the application window allowing the user to scroll in the vertical direction. Similarly, if the electronic document is so large in the horizontal direction that the entire electronic document cannot be displayed in the application window, a horizontal scroll bar area and a horizontal scroll bar appear in the application window allowing the user to scroll in the horizontal direction. A horizontal scroll bar area and a horizontal scroll bar can also appear if the display is magnified or if the electronic document uses larger fonts. Sometimes, the electronic document is large in both the horizontal and vertical directions. In this case, both horizontal and vertical scroll bars are required to navigate to any point within the electronic document.

As a result of large electronic documents, it has become increasingly difficult to effectively track and reference a particular point within an electronic document while scrolling through the remainder of the electronic document. Specifically, this problem is most evident when sequentially viewing or reading a large text document that spans several application windows, while simultaneously scrolling forward and backward to view other selections of the text document and then returning to the original point. In order to scroll through a large electronic document and find a particular point within the large electronic document, a user is required to take a pointing device or a keyboard, select the scroll bar, and "drag" the scroll bar to a location on the scroll area which the user thinks roughly corresponds with the particular point which the user is searching for within the large electronic document. The user must actually guess at the approximate location on the scroll area which he thinks corresponds with the particular point the user is searching for. If the user guesses wrong, the user must make another guess until the user actually sees the particular point in the application window. If the user is not searching for just one particular point, but actually a series of points within a large electronic document, the user must repeat this process for each point the user wishes to find. Alternatively, the user can scroll through a large electronic document and find a particular point within the large electronic document by sequentially scrolling forward or backward within the large electronic document until the user finds the particular point which the user is searching for.

Since the user must guess or sequentially scroll through the electronic document each time the user is searching for a particular point, searching for a series of points within an electronic document, or even searching for one point within a large electronic document requires a significant amount of time and patience from the user. This creates a problem since often times users are short on time and patience and need to immediately find a particular point within an electronic document.

It is apparent from conventional user interfaces that there is a need for a user interface that allows the user to reference any point within an electronic document; that allows the user to immediately find a referenced point within an electronic document; that allows the user to reference and immediately find multiple points within an electronic document; and that allows the user to reference any point within an application window.

OBJECTS AND SUMMARY OF THE INVENTION

In view of the above limitations of existing user interfaces, it is an object of the present invention to provide a user interface that allows the user to reference any point within an electronic document.

It is a further object of the present invention to provide a user interface that allows the user to immediately find a referenced point within an electronic document.

It is a further object of the present invention to provide a user interface that allows the user to reference and immediately find multiple points within an electronic document.

It is yet another object of the present invention to provide a user interface that allows the user to reference any point within an application window.

The above and other objects of the present invention are provided by methods, data processing systems or program products which provide a user interface that allows the user to insert reference markers into the application window at specific points or series of points within the application window. The reference markers are transient in nature and are only active while the current application window is open. In one embodiment of this invention, when a reference marker is inserted at a point within the application window, a first representation of the reference marker is displayed at that point and a second representation of the reference marker is displayed in the scroll bar area. The second representation of the reference marker precisely corresponds to the location of the point. By performing a pointing operation on the second representation of the reference marker, the user can cause the first representation of the reference marker along with the point to immediately appear within the application window. This allows the user to immediately find the point at any time while browsing in the application window without having to make a guess as to where the point may be.

Additional reference markers may be inserted at additional points within the application window allowing the user to immediately find and display any point within the application window that the user has referenced with a reference marker.

In another embodiment of this invention, the first representation of the reference marker may be a line. The line would mark the precise horizontal or vertical location of the operating point within the application window. While in this embodiment the reference marker is a line, the reference marker may also be a cross-hair, a box, a circle, or any object which can be displayed within an application window and which can reference the location of a point.

In a further embodiment of this invention, a pointing operation can be performed on the second representation of the reference marker to remove the reference marker from the application window.

The characteristics of the reference marker, such as size, style, position, and color can be changed by the user. In one embodiment of this invention, the user performs a pointing operation on the second representation of the reference marker, and a menu appears allowing the user to change the characteristics of the reference marker.

In yet another preferred embodiment according to this invention, if the electronic document is large in the vertical direction, a horizontal marker may be used to mark the vertical location of a point. Moreover, if the electronic document is large in the horizontal direction, a vertical marker may be used to mark the horizontal location of a point. The vertical marker is especially useful for very wide text documents, spreadsheets, or documents that include tables and/or multiple columns.

In yet another embodiment of this invention, the reference markers may be either static or dynamic in terms of their functionality. A dynamic marker may be inserted by the user at a first location in the active screen. Only a single dynamic marker is used to reference any one point on the active screen. The dynamic marker maintains its relative location within the active screen while scrolling, but can be relocated by simply pointing the mouse to a new location in the active screen and clicking the mouse. When a dynamic marker is inserted at a first location in the active screen, a first representation of the dynamic marker is displayed at that first location and a second representation of the dynamic marker is displayed in a scroll bar located within the scroll bar area. The first representation of the dynamic marker remains in the same location within the active screen. The location of the second representation of the dynamic marker within the scroll bar is proportional to the location of the first representation of the dynamic marker within the active screen.

The main intent of the dynamic marker is to aid the user in maintaining synchronization with the current viewing point in the document while scrolling forward or backward on the active screen or the entire electronic document. This is most often encountered when reaching the bottom of the active screen, paging or scrolling forward, and then returning to the operating point to continue reading the electronic document. In this case the user would just establish the dynamic marker at the operating point before scrolling forward by simply placing and clicking the mouse.

A static marker may be inserted by the user at any operating point within the electronic document and remains fixed at that operating point until it is deleted by the user or the electronic document becomes inactive. The static marker is capable of spanning the entire horizontal or vertical length of the electronic document. The user has the option to insert multiple static markers throughout the entire electronic document.

The intent of the static marker is to provide the user with an easy way to immediately return to any operating point within the electronic document. Static markers may be similar in function to bookmarks and may reference such things as hypertext links, chapter titles, pictures, objects, and critical data. By utilizing both the dynamic marker and static markers, the user can eliminate the need for tedious scrolling sequences.

As will be appreciated by those of skill in this art, the above described aspects of the present invention may also be provided as apparatus or computer program products and is particularly well suited to program tools or applications that launch applications windows for electronic documents.

BRIEF DESCRIPTION OF THE DRAWINGS

FIG. 5 is a diagram of a large electronic document according to the present invention spanning multiple application windows and having static and dynamic markers;

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable storage medium may be utilized including hard disks, CD-ROMs, DVD-ROMs, optical storage devices, or magnetic storage devices.

Figure 1:
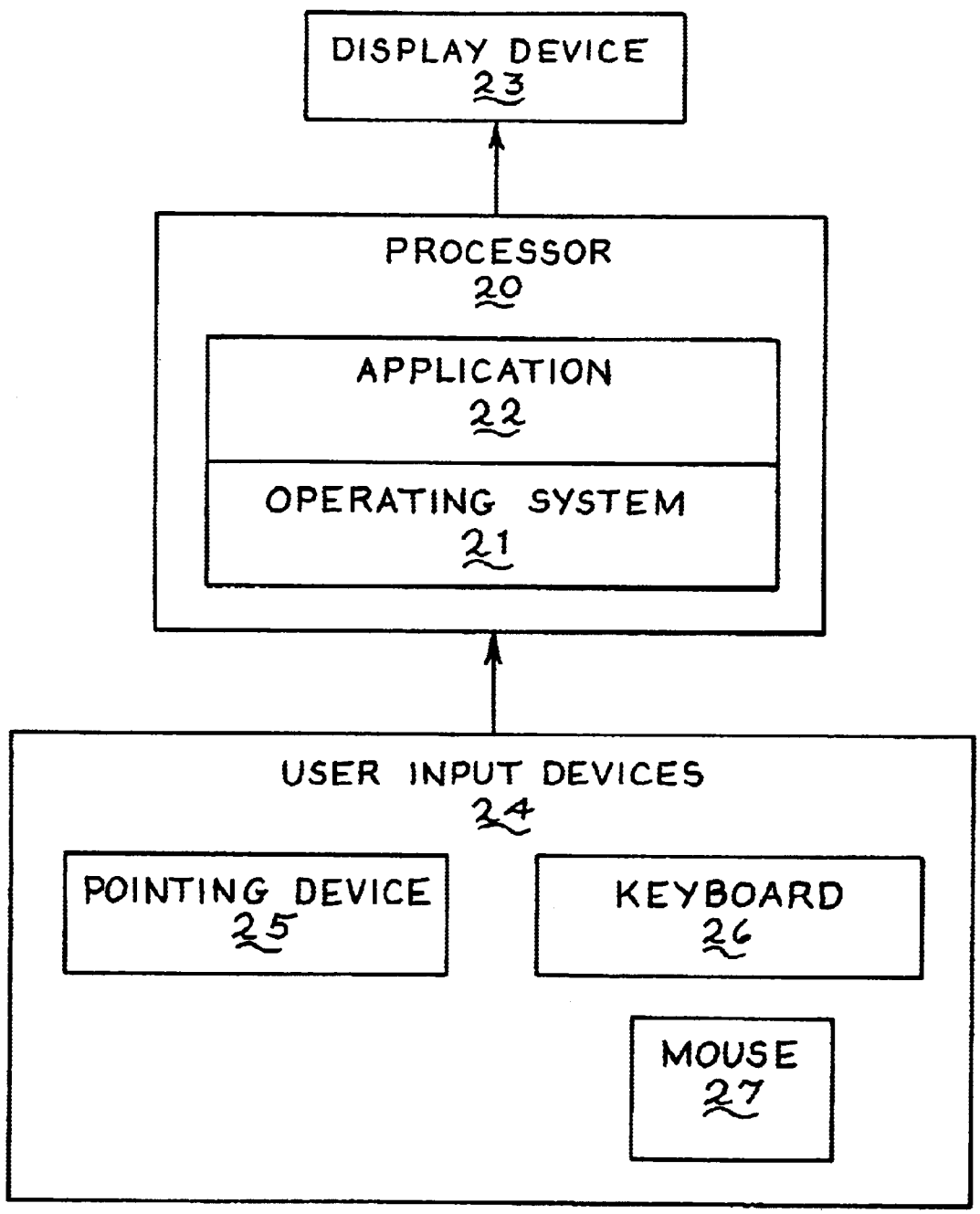
FIG. 1 is a block diagram of a system utilizing the present invention.

FIG. 1 illustrates a data processing system on which user interfaces according to the present invention may be utilized. As seen in FIG. 1, a processor 20 may have an operating system 21 resident in the processor 20. An application 22 may be running on the operating system 21. The processor 20 displays information on a display device 23. The display device 23 has a plurality of picture elements (collectively referred to as a screen) which may define the appearance of a user interface environment displayed on the display device 23. The contents of the screen of the display device 23 and, therefore, the appearance of the user interface environment, may be controlled or altered by the application 22 or the operating system 21 either individually or in combination.

For obtaining input from a user, the operating system 21, the application 22 or both may utilize user input-devices 24. User input devices 24 may include a pointing device 25 and a keyboard 26 or other input devices known to those of skill in the art, such as a mouse 27. User input devices 24 may be used to designate areas of the screen by performing a pointing operation on those areas. For example, user input devices 24 may be used to designate a border 40 which surrounds an application window 30 or a scroll bar 44 which is in a scroll bar area 42. Furthermore, once designated, the user interface may display a separate icon to indicate that selection of that location of the screen may translate the feature of the application window 30 to a different location on the screen. Alternatively, the user interface may display a menu 38 to indicate that certain characteristics of that selection of that location of the screen may be changed.

Figure 2:
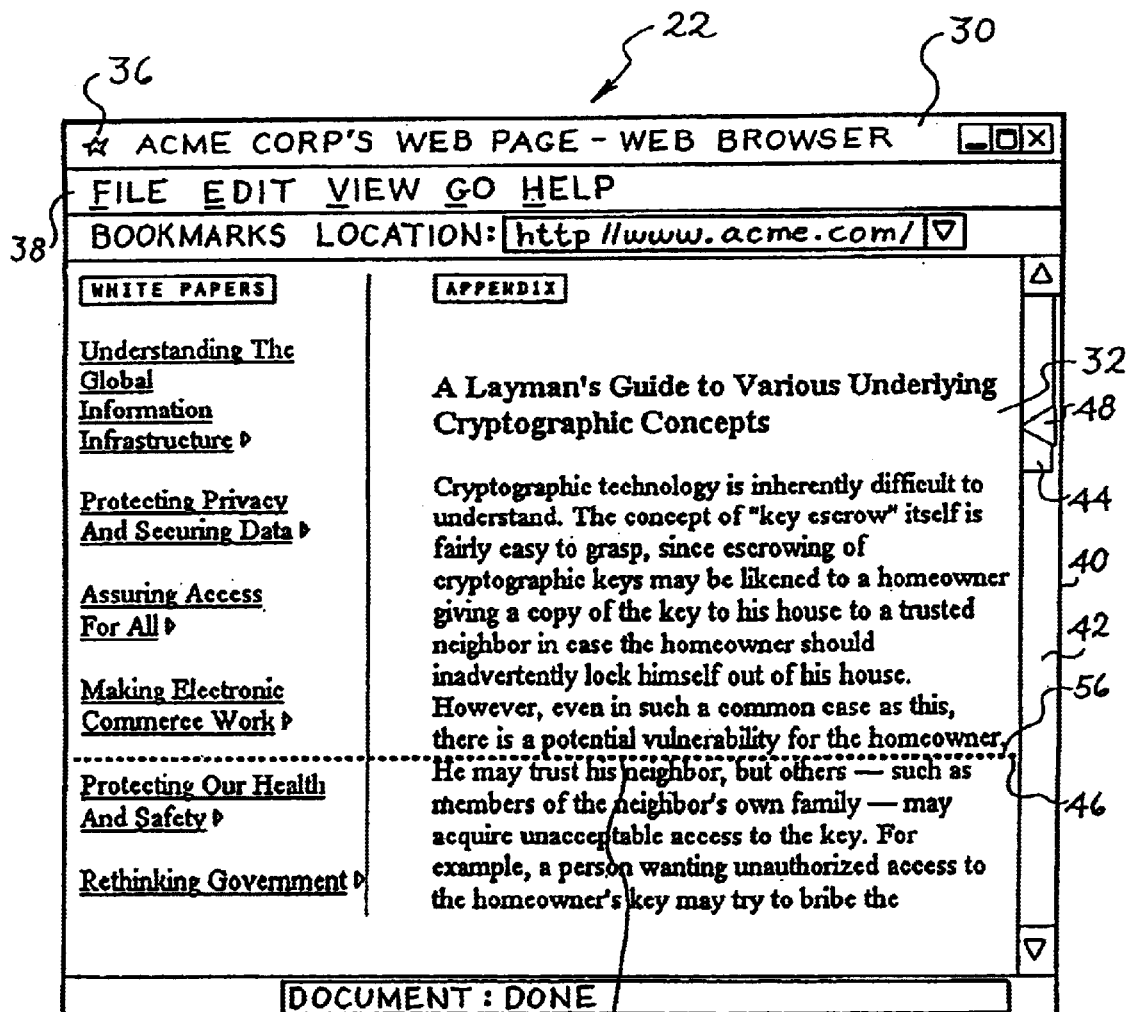
FIG. 2 is a diagram of a screen with a user interface according to the present invention having a reference marker.

FIG. 2 illustrates one preferred embodiment of the present invention. As seen in FIG. 2 an application window 30 has a title bar 36, a menu 38, and an electronic document 32 all displayed within the application window 30. The application window 30 presents a user interface and may be considered, for example, a desktop. The application window 30 is defined by a resizable border 40 which circumscribes the periphery of the application window 30. For purposes of this invention, we will define the current display within the application window 30 as an active screen 34. We will also define the term application window 30 as encompassing the term active screen 34.

The title bar 36 displays the title of the application 22 running in the application window 30, while the menu 38 displays the menu options that the user may select, with a user input device 24, when using the application 22. While the title bar 36 and the menu 38 are displayed within the application window 30, they are not part of the electronic document 32. The electronic document 32 may be a word processing file, a spreadsheet, an HTML document, a graphics document, a presentation document, or any other document which can be displayed within the application window 30.

In a large electronic document 32 only a portion of the electronic document 32 can be viewed in the application window 30, so a scrolling bar area 42 including a scrolling bar 44 is displayed within the application window 30, as seen in FIG. 2. The scrolling bar 44 allows the user to scroll through the entire electronic document 32 to any point within the electronic document 32.

As seen in FIG. 2, a reference marker 56 can be inserted at a point 62 within the application window 30. The reference marker 56 can be used to mark the location of any point within the application window 30. When a reference marker 56 is inserted at the point 62 within the electronic document 32, a first representation 46 of the reference marker 56 is displayed at the point 62 and a second representation 48 of the reference marker 56 is displayed in the scroll bar area 42.

The position of the second representation 48 of the reference marker 56 within the scroll bar area 42 corresponds to the location of the point 62 and the first representation 46 of the reference marker 56 within the application window 30. The reference marker 56 can be used to designate any point 62 within the application window 30. In one preferred embodiment of this invention, multiple reference markers 56 may be used to designate the locations of multiple points 62 within the electronic document 32. Multiple reference markers 56 allow the user to find and display any one of a multiple of points 62 within the electronic document 32 that the user has referenced with a reference marker 56.

In another preferred embodiment of this invention, a pointing operation can be performed on the second representation 48 of the reference marker 56 to cause the first representation 46 of the reference marker 56 along with the point 62 to immediately appear within the application window 30. This allows the user to immediately view the point 62, the first representation 46, and the area surrounding point 62, at any time while browsing through the electronic document 32.

In one preferred embodiment of this invention, the first representation 46 of the reference marker 56 is a line, as seen in FIG. 2. The line marks the precise horizontal or vertical location of the point 62 within the application window 30. While in this embodiment the reference marker 56 is a line, the reference marker 56 may be of any style such as a cursor cross-hair, a box, a circle, or any object which can be displayed within an application window 30 and which can designate the location of a point such as point 62. In one preferred embodiment of this invention, reference marker 56 is a dashed line, as seen in FIG. 2. The first representation 46 and the second representation 48 of the reference marker 56 can also be any color. Varying the color of the first representation 46 and the second representation 48 of reference marker 56 allows the user to more easily distinguish between multiple reference markers 56, when multiple reference markers 56 are used to designate multiple points 62.

In a further preferred embodiment of this invention, a pointing operation can be performed on the second representation 48 of the reference marker 56 to remove the first representation 46 and the second representation 48 of the reference marker 56 from the electronic document 32.

In one preferred embodiment of this invention, the characteristics of the reference marker 56, such as size, style, position, and color can be changed by the user. In one preferred embodiment according to this invention, the user performs a pointing operation on the second representation 48 of the reference marker, and a menu appears offering the user the opportunity to change any characteristics of the first representation 46 and the second representation 48 of the reference marker 56. The user may make individual changes which apply to specific reference markers 56 or the user may make global changes which apply to all reference markers 56 within the electronic document 32.

Figure 6:
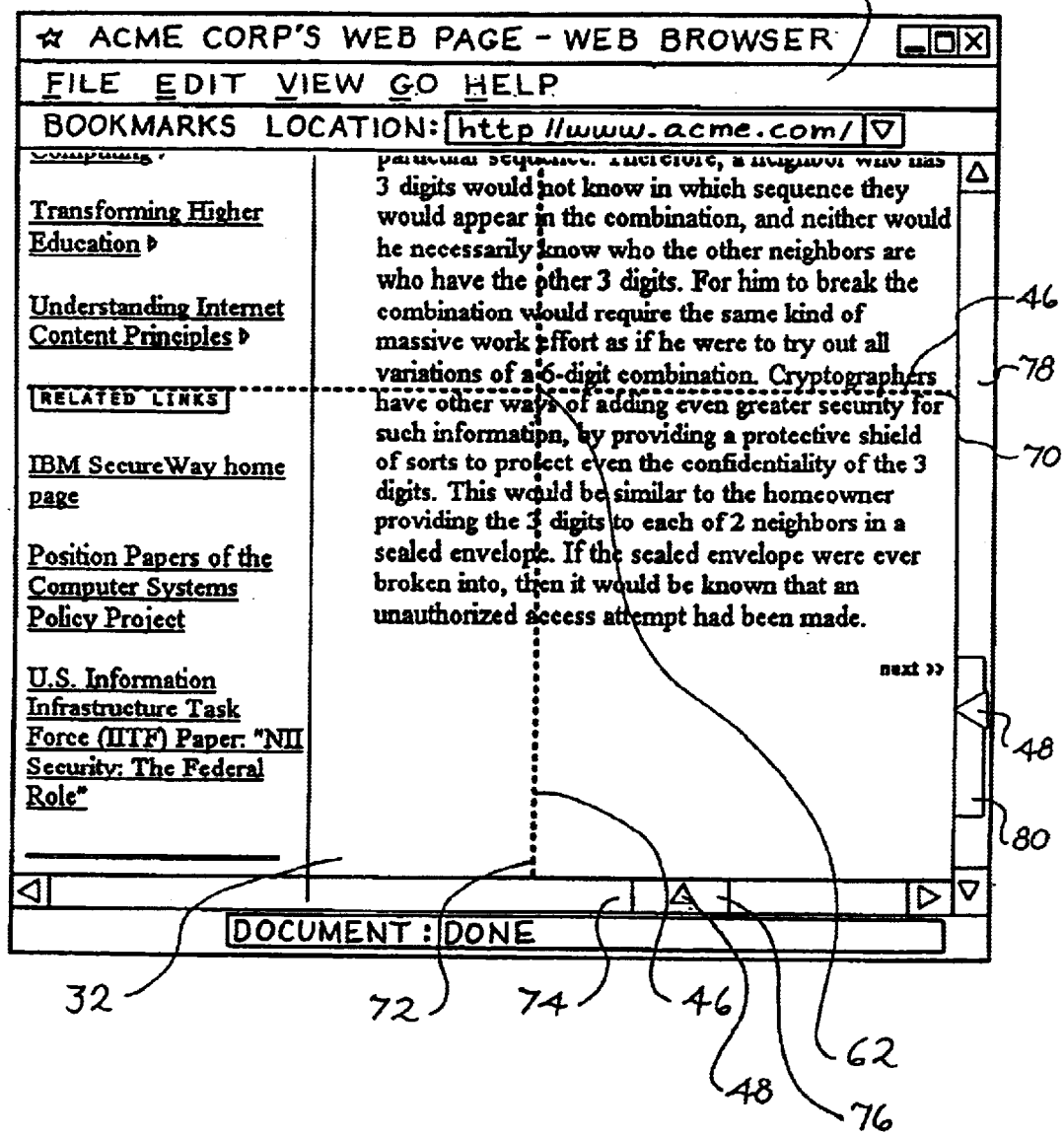
FIG. 6 is a diagram of a screen with a user interface according to the present invention having a horizontal and vertical reference markers.

If the electronic document 32 is so large in the vertical direction that the entire electronic document 32 cannot be displayed in the application window 30, a vertical scroll bar area 78 and a vertical scroll bar 80 appear in the application window 30 allowing the user to scroll in the vertical direction, as seen in FIG. 6. Similarly, if the electronic document 32 is so large in the horizontal direction that the entire electronic document 32 cannot be displayed in the application window 30, a horizontal scroll bar area 74 and a horizontal scroll bar 76 appear in the application window 30 allowing the user to scroll in the horizontal direction, as seen in FIG. 6. If the electronic document 32 is large in both the horizontal and vertical directions, a horizontal scroll bar 76 and vertical scroll bar 80 are required to navigate to any point within the electronic document 32.

In one preferred embodiment of this invention the reference marker 56 is a horizontal marker 70 denoting the vertical position of the point 62, as seen in FIG. 6. The horizontal marker 70 is especially useful for electronic documents 32, such as text documents or spreadsheets, which are large in the vertical direction. When the horizontal marker 70 is inserted at the point 62 within the electronic document 32, a first representation 46 of the horizontal marker 70 is displayed at the point 62 and a second representation 48 of the horizontal marker 70 is displayed in the vertical scroll bar area 78.

In another preferred embodiment of this invention, the reference marker 56 is a vertical marker 72 denoting the horizontal position of the point 62, as seen in FIG. 6. The vertical marker 72 is especially useful for very wide text documents, spreadsheets, or documents that include tables and/or multiple columns. When the vertical marker 72 is inserted at the point 62 within the electronic document 32, a first representation 46 of the vertical marker 72 is displayed at the point 62 and a second representation 48 of the vertical marker 72 is displayed in the horizontal scroll bar area 74.

If the electronic document 32 or application window 30 is large in the horizontal direction and vertical direction, both a horizontal marker 70 and a vertical marker 72 may be used to designate the precise location of point 62.

Figure 3:
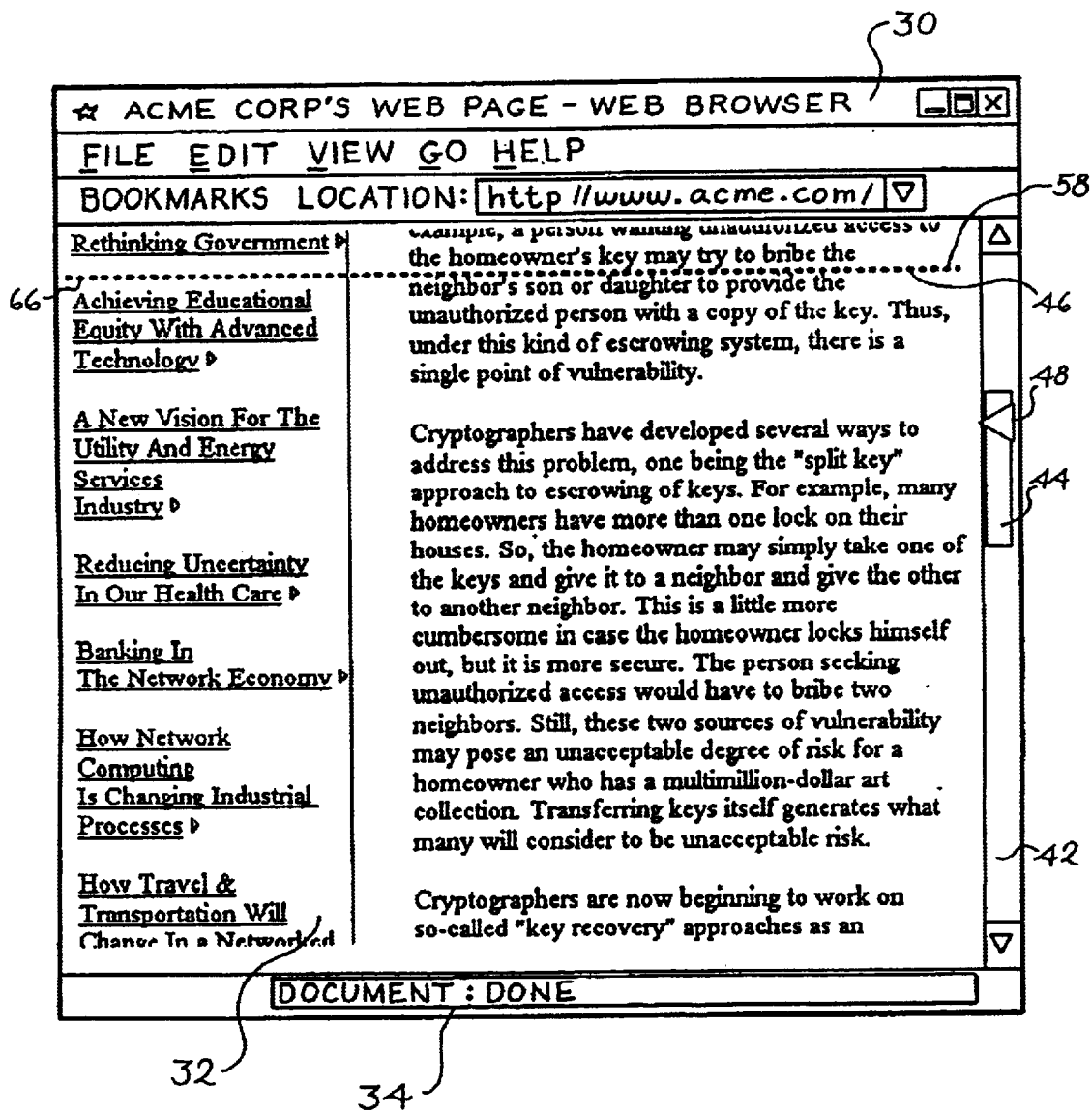
FIG. 3 is a diagram of a screen with a user interface according to the present invention having a dynamic marker.
Figure 4:
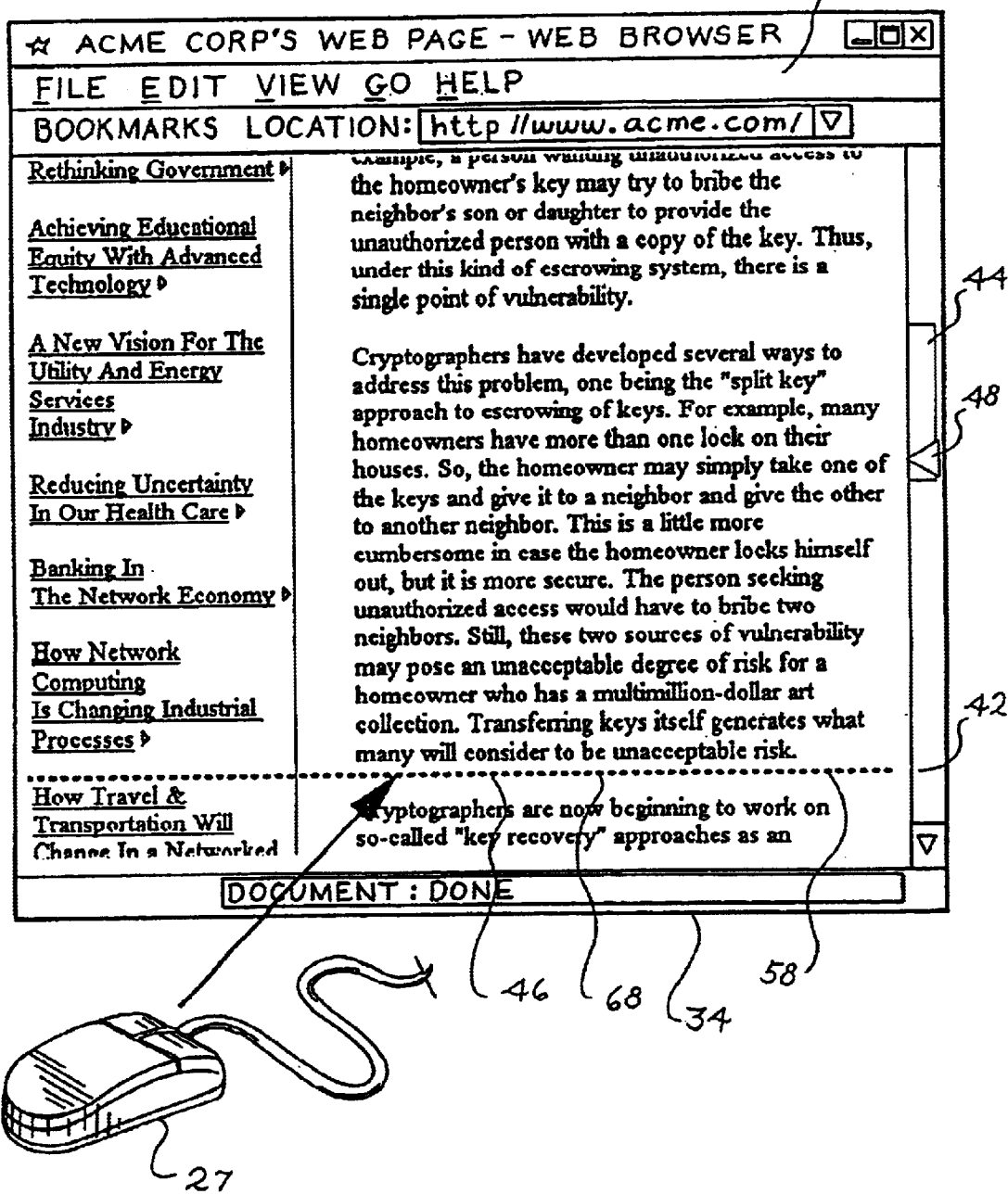
FIG. 4 is a diagram of a user interface of FIG. 3 after the dynamic marker has been repositioned in the active screen.

In one preferred embodiment of this invention, the reference marker 56 is a dynamic marker 58 displayed in the active screen 34, as seen in FIGS. 3–4. The dynamic marker 58 is inserted at a first location 66 in the active screen 34, as seen in FIG. 3. A single dynamic marker 58 may be used to designate any one location or point on the active screen 34. The dynamic marker 58 maintains its relative location within respect to the active screen 34 while scrolling. In one preferred embodiment of this invention, the dynamic marker 58 can be relocated from the first location 66 to a second location 68 by performing a pointing operation at the second location 68 on the active screen 34, as seen in FIGS. 3–4. In another preferred embodiment of this invention, the dynamic marker 58 can be removed entirely from the active screen 34 by performing a pointing operation on the second representation 48 of the dynamic marker 58.

When dynamic marker 58 is inserted at the first location 66 in the active screen 34, a first representation 46 of the dynamic marker 58 is displayed at the first location 66, and a second representation 48 of the dynamic marker 56 is displayed in a scroll bar 44 located within the scroll bar area 42. The first representation 46 of the dynamic marker 58 remains in the same location with respect to the active screen 34 at all times. The location of the second representation 48 of the dynamic marker 58 within the scroll bar 44 is in proportion to the location of the first representation 46 of the dynamic marker 58 within the active screen 34.

The dynamic marker 58 may be used to aid the user in maintaining synchronization with the current viewing point in the electronic document 32 while scrolling forward or backward on the active screen 34 or the entire electronic document 32. For example, if the user reaches the bottom of the application window 30 containing point 62 and then scrolls forward in the electronic document 32 leaving behind point 62, the user may become disoriented when returning to the application window 30 containing point 62. In this example, the user would just establish the dynamic marker 58 at the point 62 before scrolling forward, thus allowing the user to maintain his bearings upon returning to point 62.

In one preferred embodiment of this invention, the reference marker 56 is a static marker 60 displayed in the electronic document 32. The static marker 60 is inserted at an operating point 64 located in the electronic document 32, as seen in FIG. 5. A single static marker 60 may be used to designate any one operating point 64 in the electronic document 32. In one preferred embodiment of this invention, multiple static markers 60 may be used to designate multiple operating points 64 in the electronic document 32. The static marker 60 maintains its relative location within the electronic document 32 while scrolling. The static marker 60 is capable of spanning the entire horizontal or vertical length of the electronic document 32.

When the static marker 60 is inserted at the operating point 64 in the electronic document 32, a first representation 46 of the static marker 60 is displayed at the operating point 58, and a second representation 58 of the static marker 60 is displayed in the scroll bar area 42. The first representation 46 of the static marker 60 remains in the same location in the electronic document 32 at all times. The location of the second representation 48 of the static marker 60 within the scroll bar area 42 is in proportion to the location of the first representation 46 of the static marker 60 within the electronic document 32. The static marker 60 remains fixed at the operating point 64 until the electronic document 32 become inactive.

In one preferred embodiment of this invention, the static marker 60 can be removed from the electronic document 32 by performing a pointing operation on the second representation 48 of the static marker 60, as seen in FIG. 5.

In another preferred embodiment of this invention, a pointing operation can be performed on the second representation 48 of the static marker 60 to cause a portion of the electronic document 32 including the operating point 64 to be displayed. This pointing operating allows the user to immediately find any operating point which has been referenced using a static marker 60.

The intent of the static marker 60 is to provide the user with an easy way to reference and immediately find any operating point 64 within the electronic document 32. Static markers 60 may be similar in function to bookmarks and may references such things as hypertext links, chapter titles, pictures, objects, and critical data. By utilizing both the dynamic marker 58 and static markers 60, the user can eliminate the need for tedious scrolling sequences.

In one preferred embodiment of this invention, the characteristics of the static marker 60, or the dynamic marker 58, such as size, style, position, and color can be changed by the user. In one preferred embodiment according to this invention, the user performs a pointing operation on the second representation 48 of the static marker 60, or the dynamic marker 58, and a menu appears offering the user the opportunity to change any characteristics of the static marker 60, or the dynamic marker 58.

In one preferred embodiment of this invention, the first representation 46 of the static marker 60 and the dynamic marker 58 is a line, as seen in FIG. 5. The line would mark the precise horizontal or vertical location of the operating point 64 within the electronic document 32. While in this embodiment the static marker 60 and the dynamic marker 58 are lines, the static marker 60 and the dynamic marker 58 may be of any style such as a cursor cross-hair, a box, a circle, or any object which can be displayed within an application window and which can designate the location of a point such as operating point 64. In one preferred embodiment of this invention, the first representation 46 of the static marker 60 and the dynamic marker 58 is a dashed line, as seen in FIG. 5. The first representation 46 of the static marker 60 and the dynamic marker 58 can also be any color. Varying the color of the first representation 46 of static marker 60 and the dynamic marker 58 allows the user to more easily distinguish between multiple static markers 60 and a single dynamic marker 58 when multiple static markers 60 and a single dynamic marker 58 are used.

While the above use of static markers 60 and dynamic markers 58 has been described with respect to electronic documents 32 in general, as will be appreciated by those of skill in the art, the same use of static markers 60 and dynamic markers 58 may be readily accomplished with electronic documents 32 which are large in either the vertical direction, the horizontal direction, or both the vertical and horizontal directions.

As will be appreciated by those of skill in this art, the preceding examples are provided, not to limit or define the scope of the present invention, but to illustrate the nature of the present invention and possible uses for the teachings of the present invention. These examples may be modified in many different ways while still obtaining the benefits of the teachings of the present invention. For example, the present examples have been illustrated with respect to an application window 30 and an electronic document 32, however, the present invention should not be construed as limited in that the use of reference markers 56 to reference a point 62 of the present invention applies equally to application windows within an application window 30. Accordingly, as used herein the term application window may refer to a window-like workspace on a desktop as described above or may refer to a resizable subdivision of a workspace. In such a case, the application window 30 may be considered a "workspace" and the application windows 30 described herein may be considered subdivisions of the workspace.

Figure 7:
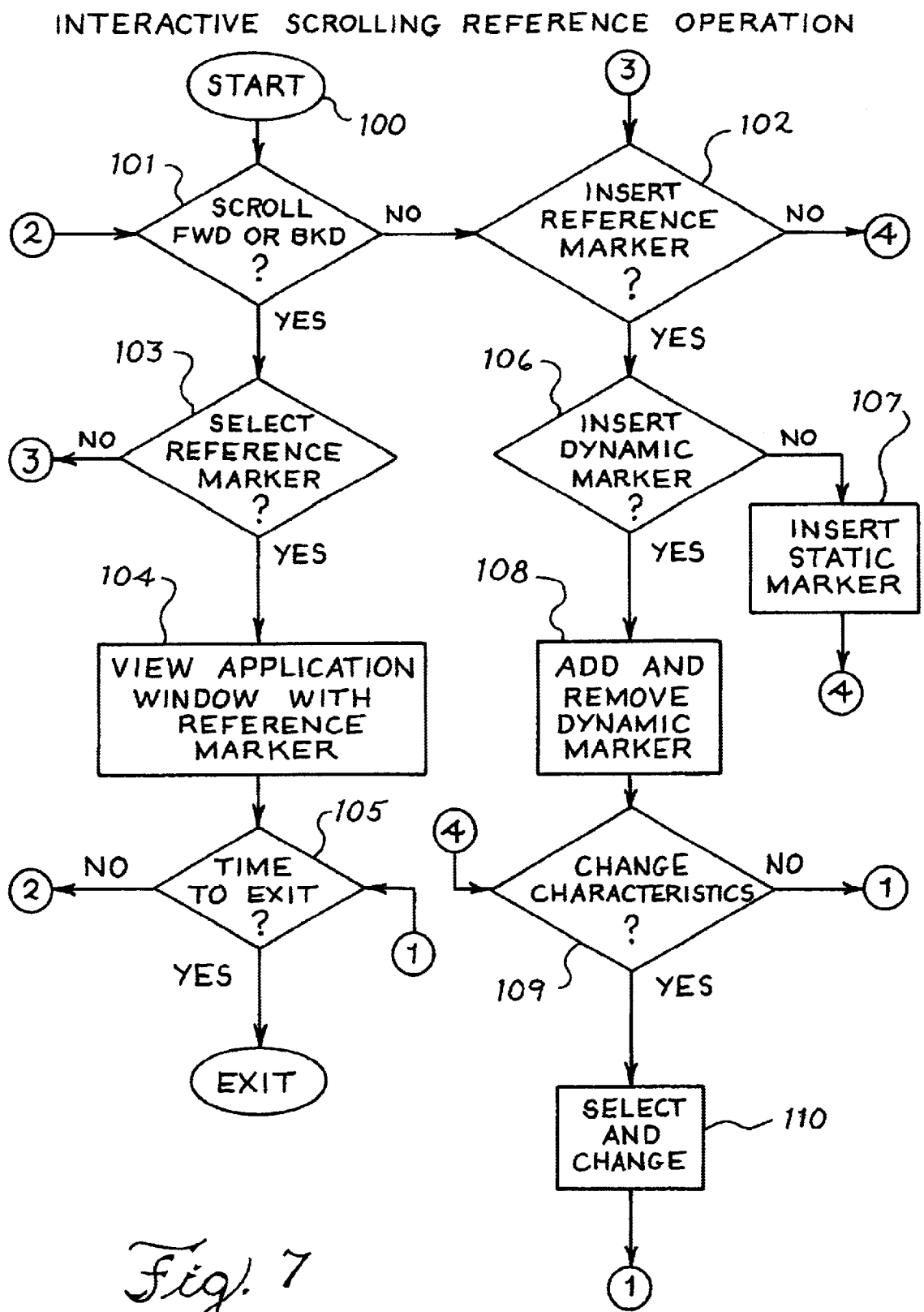
FIG. 7 is a flow chart of the operation of the present invention.

FIG. 7 is a flowchart illustration of methods, apparatus (systems) and computer program products according to the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

As seen in FIG. 7 an interactive scrolling reference operation is initiated in block 100. The interactive scrolling reference operation gives the user the option of scrolling through electronic document 32 by selecting reference markers 56. The interactive scrolling reference operation also allows the user to insert reference markers 56 into electronic document 32 and change certain characteristics of reference markers 56, such as size, style, position, and color.

The interactive scrolling reference operation first determines whether the user would like to scroll forward or backward through electronic document 32, as seen in block 101. If the user would not like to scroll forward or backward though electronic document 32, the interactive scrolling reference operation moves to block 102. Block 102 determines whether the user would like to insert reference marker 56 into electronic document 32. If the user would like to insert reference marker 56, then interactive scrolling reference operation moves to block 106. If the user would not like to insert reference marker 56 into electronic document 32, then interactive scrolling reference operation moves to block 109. Block 106 determines whether the user would like to insert dynamic marker 58 into electronic document 32. If the user would like to insert dynamic marker 58, then interactive scrolling reference operation moves to block 108. Block 108 inserts dynamic marker 58 into electronic document 32 at the location specified by the user. Additionally, block 108 removes any other dynamic marker 58 located within application window 30 and then interactive scrolling reference operation moves to block 109.

If the user would not like to insert dynamic marker 58, then interactive scrolling reference operation moves to block 107. Block 107 inserts static marker 60 into electronic document 32 and then interactive scrolling reference operation moves to block 109. Block 109 allows the user to change characteristics of reference markers 56, such as such as size, style, position, and color. If the user would not like to change characteristics of reference markers 56, interactive scrolling reference operation moves to block 105. However, if the user would like to change characteristics of reference markers 56, interactive scrolling reference operation moves to block 110, whereupon the user is given the option to change characteristics of reference markers 56, such as such as size, style, position, and color. The user may make individual changes which apply to specific reference markers 56 or the user may make global changes which apply to all reference markers 56. Once the changes are made interactive scrolling reference operation moves to block 105.

If the user would like to scroll forward or backward though electronic document 32, the interactive scrolling reference operation moves to block 103. Block 103 determines whether the user would like to select a reference marker 56. If the user would like to select a reference marker 56, then the interactive scrolling reference operation moves to block 104 and allows the user to view the application window 30 along with the reference marker 56. If the user would not like to select a reference marker 56, then interactive scrolling reference operation moves to block 102. Once the user has viewed the application window 30 along with reference marker 56, as seen in block 104, the interactive scrolling reference operation moves to block 105. Block 105 determines, either through user input or by input from the processor 20, whether to exit interactive scrolling reference operation. If block 105 has determined that it is time to exit, then interactive scrolling reference operation is ended. As will be appreciated by those of skill in the art, any of the conditions described above for scrolling through electronic documents and inserting reference markers into application windows, electronic documents, or the like, may be implement utilizing these operations.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method of referencing a point in an application window while scrolling through an electronic document displayed in the application window, where a scroll bar area corresponding to the electronic document is displayed, and where a portion of the electronic document is presently displayed on an active screen, the method comprising the steps of:

inserting a dynamic marker at a first location on the active screen;

causing a first representation of the dynamic marker to be displayed at the first location in the active screen such that said first representation of the dynamic marker remains in the same location within view of the active screen at all times; and causing a second representation of the dynamic marker to be displayed in a scroll bar located in the scroll bar area.

2. A method according to claim 1, further comprising the steps of:

inserting a static marker into the electronic document at an operating point therein;

causing a first representation of the static marker to be displayed at the operating point in the electronic document; and causing a second representation of the static marker to be displayed in the scroll bar area.

3. A method according to claim 1, further comprising the step of performing a pointing operation on the second representation of the dynamic marker to remove the dynamic marker from the active screen.

4. A method according to claim 1, further comprising the step of performing a pointing operation at a second location on the active screen to move the dynamic marker from the first location to the second location.

5. A method according to claim 2, further comprising the step of performing a pointing operation on the second representation of the static marker to remove the static marker from the electronic document.

6. A method according to claim 2 further comprising the step of performing a pointing operation on the second representation of the static marker to cause a portion of the electronic document including the operating point to be displayed.

7. A method according to claim 2, further comprising the step of performing a pointing operation on the second representation of the static marker to allow a user to define display characteristics of the static marker.

8. A method according to claim 2, wherein the first representation of the static marker is a line.

9. A computer program for referencing a point in an application window while scrolling through an electronic document displayed in the application window, where a scroll bar area corresponding to the electronic document is displayed, and where the electronic document is presently displayed on an active screen, the computer program comprising:

a storage medium;

dynamic insertion code on the storage medium for inserting a dynamic marker at a first location on the active screen;

primary dynamic code on the storage medium for causing a first representation of the dynamic marker to be displayed at the first location in the active screen such that said first representation of the dynamic marker remains in the same location within view of the active screen at all times; and secondary dynamic code on the storage medium for causing a second representation of the dynamic marker to be displayed in a scroll bar located in the scroll bar area.

10. A computer program according to claim 9, further comprising:

static insertion code on the storage medium for inserting a static marker at an operating point in the electronic document;

primary static code on the storage medium for causing a first representation of the static marker to be displayed at the operating point in the electronic document; and secondary static code on the storage medium for causing a second representation of the static marker to be displayed in the scroll bar area.

11. A computer program according to claim 9, further comprising dynamic deletion code on the storage medium responsive to user input, for removing the dynamic marker from the active screen.

12. A computer program according to claim 10, further comprising static deletion code on the storage medium responsive to user input, for removing the static marker from the electronic document.

13. A computer program according to claim 10, further comprising static reference code on the storage medium responsive to user input, for causing a portion of the electronic document including the operating point to be displayed upon performing a pointing operation on the second representation of the static marker.

14. A computer program according to claim 10, further comprising static edit code on the storage medium responsive to user input, for changing the characteristics of the static marker upon performing a pointing operation on the second representation of the static marker.

15. A computer program according to claim 14, further comprising dynamic edit code on the storage medium responsive to user input, for changing the characteristics of the dynamic marker upon performing a pointing operation on the second representation of the dynamic marker.

* * * * *